(12) United States Patent
Fiebig et al.

(10) Patent No.: US 7,095,235 B2
(45) Date of Patent: Aug. 22, 2006

(54) MONITORING DEVICE, ELECTRICAL MACHINE TOOL, CURRENT SUPPLY DEVICE, AND ASSOCIATED METHOD OF OPERATION

(75) Inventors: Arnim Fiebig, Leinfelden-Echterdingen (DE); Hans-Joachim Baur, Leinfelden-Echterdingen (DE); Guenter Lohr, Leinfelden-Echterdingen (DE); Stefan Roepke, Leinfelden (DE); Rainer Glauning, Aichtal-Groetzingen (DE); Volker Bosch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/390,840

(22) Filed: Mar. 18, 2003

(65) Prior Publication Data

US 2003/0184308 A1    Oct. 2, 2003

(30) Foreign Application Priority Data

Mar. 30, 2002   (DE) ................ 102 14 364

(51) Int. Cl.
    *G01R 31/02*    (2006.01)
    *G01R 31/14*    (2006.01)
    *G05D 23/00*    (2006.01)
    *H03L 7/00*    (2006.01)

(52) U.S. Cl. ............... 324/417; 324/511; 318/473; 327/152

(58) Field of Classification Search ............. 324/511, 324/417, 772; 388/937, 934; 318/471, 472, 318/473, 634, 639, 217, 717, 798, 365–366; 307/326, 116; 327/152
See application file for complete search history.

(56) References Cited

U.S. PATENT DOCUMENTS

| | | | | |
|---|---|---|---|---|
| 3,666,990 | A | | 5/1972 | Strobl et al. ............ 317/13 C |
| 3,745,368 | A | * | 7/1973 | Spicer .................... 307/116 |
| 4,414,499 | A | * | 11/1983 | Hedges .................. 318/798 |
| 4,652,801 | A | * | 3/1987 | Burdett .................. 318/481 |
| 5,480,734 | A | | 1/1996 | Schulz et al. ............ 429/7 |
| 5,508,126 | A | * | 4/1996 | Braun .................... 429/7 |
| 5,795,664 | A | * | 8/1998 | Kelly ..................... 429/7 |
| 6,170,241 | B1 | | 1/2001 | Shibilski et al. |
| 6,614,256 | B1 | * | 9/2003 | Bonduel et al. ......... 324/772 |
| 6,661,195 | B1 | * | 12/2003 | Schmidt et al. ......... 318/778 |

FOREIGN PATENT DOCUMENTS

| | | |
|---|---|---|
| DE | 41 19 941 | 1/1993 |
| DE | 42 34 231 | 4/1994 |
| GB | 2 299 224 A | 9/1965 |
| JP | 9195950 | 7/1997 |

* cited by examiner

*Primary Examiner*—Anjan Deb
*Assistant Examiner*—Jeff Natalini
(74) *Attorney, Agent, or Firm*—Michael J. Striker

(57) ABSTRACT

A monitoring device for an electrical machining tool, in particular for temperature monitoring with an accumulator-driven machine, includes a switch element (12) for separating an electrical consumer (14) from a current supply device (10). For detection of a first operating parameter ($T_{MOTOR}$) of the consumer (14) and/or the current supply device (10), a first sensor (16) is provided, whereby the first sensor (16) is connected with a display unit and/or with the control input of the switch element, in order to control the switching process as a function of the first operating parameter ($T_{MOTOR}$). Furthermore, the present invention relates to an electrical machining tool as well as a current supply device with the inventive monitoring device and a corresponding method of operation.

24 Claims, 2 Drawing Sheets

MONITORING DEVICE, ELECTRICAL MACHINE TOOL, CURRENT SUPPLY DEVICE, AND ASSOCIATED METHOD OF OPERATION

BACKGROUND OF THE INVENTION

The present invention relates to monitoring device for an electrical machining tool, an electrical machining tool or a current supply device with the inventive monitoring device, as well as a corresponding method of operation.

With today's electrical machining tools, such as, for example, hand drills and accumulator worms, the operating temperature is not monitored, which is problematic in two different views.

For one, exceeding of an apparatus-specific maximum temperature can lead to damage of the electrical machining tool or of the accumulator that serves to supply the current, which must be observed by the respective user, in particular, with a heavy mechanical load of the electrical machining tool.

For another, the longevity of an accumulator is reduced substantially, when the accumulator is discharged at very low temperatures. In particular, after a long storage period of an electrical machining tool in cold spaces, the accumulator, then, possibility should be warmed up to the operating temperature first before the electrical machining tool is used.

SUMMARY OF THE INVENTION

The invention therefore contemplates a monitoring device for an electrical machining tool, which detects an operating parameter of the electrical machining tool with a sensor and as a function of the detected operating parameters, activates a switch element, which separates an electrical consumer from a current supply device or connects with this.

The parameter-dependent activation of the switch element can take place directly by choice or under intermediate switching of an evaluation unit, which, for example, can take into consideration other parameters.

Alternatively or additionally, the sensor for the operating parameter to be detected also can activate a display unit, which shows the user the value of the detected operating parameter qualitatively or quantitatively, whereby the display unit in the frame of the invention can emit an acoustic and/or optical signal.

The display unit can comprise a warning buzzer, which emits an acoustic warning signal, when the detected operating parameters exceeds or falls below a predetermined threshold value.

However, it is also possible that the display unit comprises a signal lamp, or warning light, which lights up upon exceeding or falling below of a predetermined threshold value for the detected operating parameter.

Further, the display unit also can reproduce quantitatively the value of the operating parameter to be detected, in which, for example, a scale instrument or a numeric display unit is used.

In a preferred embodiment of the present invention, with the monitored operating parameter, the temperature of the electric machining tool or an accumulator that serves as a current supply is considered. The invention in consideration of the monitored operating parameter, however, is not limited to the temperature. In addition, in the frame of the invention, also other operating parameters can be determined, such as, for example, the current use, the supply voltage, or the electrical power input from the electric machining tool.

In addition, it is to be noted that the sensor can measure the operating parameter to be monitored directly or indirectly. For example, the operating temperature can be determined directly by means of a thermometer or indirectly by means of measurement of a temperature-dependent resistance.

In one variation of the invention, two sensors are provided, whereby one of the sensors determines an operating parameter of the electrical consumer of the electrical machining tool, while the other sensor measures an operating parameter of the associated current supply device. The use of two sensors is advantageous, since the electrical consumer in the electrical machining tool on the one hand and the current supply device on the other hand, upon loading, can heat up very differently. Preferably, one of the sensors therefore measures the operating temperature of the motor of the electrical machining tool, while the other sensor determines the operating temperature of the accumulator. The actuation of the electrical machining tool takes place, then, as a function of both operating parameters, whereby for the two operating parameters, different threshold values can be determined, which takes into consideration the respective thermal capacitance of the current supply device on the one hand and the electrical consumer on the other hand.

Further, more than two sensors can be used, which detect different operating parameters or are arranged at different position in the electrical machining tool.

Preferably, a comparator unit is provided, which compares the operating parameter determined from the sensor with a predetermined minimal value and/or with a predetermined maximal value and regulates the switch element accordingly.

So, as a rule, a switching off takes place, when the monitored operating parameter exceeds the specified maximum value, in order to prevent damage of the electrical machining tool or the associated current supply device. Preferably, the electrical machining tool, then, is also automatically switched off, if the monitored operating parameter falls below the specified minimal value, since, for example, a discharge of a very cold accumulator shortens the longevity of the accumulator.

With the previously described variation with multiple sensors, a comparator unit can be provided for each sensor, in order to enable the output signals of the individual sensors to be individually evaluated. Thus, it is possible, for example, that a comparator unit compares the operating temperature of the motor of the electrical machining tool with a specified maximum value and/or a specified minimal value, while another comparator unit compares the operating temperature of the associated current supply unit with a specified minimal value and/or a specified maximum value. In this connection, the minimal or maximum values of both comparator units can be different, in order to enable the different thermal capacitance of the electrical machining tool and the current supply device to be considered.

The actual activation of the electrical machining tool takes place by means of a controllable switch element, such as, for example, a relay, a power transistor, or a bi-metal switch.

In addition, the present invention relates also to an electrical machining tool with the above-described type of monitoring device. The inventive monitoring device, then, can be integrated in various, common electrical machining tools and for example, can monitor their operating temperature.

Alternatively, it is also possible that the inventive monitoring device is integrated in a current supply device, such as, for example, an accu-pack, and monitors its temperature.

Further, the present invention also relates to a corresponding method of operation, which has been previously explained.

Moreover, it is to be noted that the individual components of the inventive monitoring device can be distributed somewhat arbitrarily among the electrical apparatus and the current supply device (for example, the accu-pack). Thus, the switch element, for example, can be arranged selectively in the electrical apparatus or in the current supply device. In the same manner, also the sensor can be arranged selectively in the electrical apparatus or in the current supply device. Finally, it is also possible that the evaluation unit is arranged selectively in the electrical apparatus or in the current supply device. In this connection, arbitrary combinations of the arrangement of the components in the electrical apparatus or in the current supply device are possible.

In addition, the invention is not limited to distributing the individual components (switch element, sensor, comparator unit or evaluation unit) of the inventive monitoring device among two apparatus.

Thus, for example, hand-held machining tools can be supplied with current by an accu-pack, whereby additionally, a miter gear attachment is mounted. In this connection, it is possible that the temperature sensor is arranged in the miter gear attachment, while the switch element is integrated in the accu-pack.

In the frame of the invention, then, also a combination of three, four, or more units is possible, which each embody singly or commonly the inventive monitoring device, whereby the individual components of the inventive monitoring device can be distributed as desired among the individual units.

BRIEF DESCRIPTION OF THE DRAWINGS

Further advantages are provided from the following description of the drawings. In the drawings, one embodiment of the invention is represented. The drawings, the description, and the claims contain numerous features in combination. The practitioner also is to consider the features individually and combination them for further, appropriate combinations.

DETAILED DESCRIPTION OF THE PREFERRED EMBODIMENTS

Figure 1:
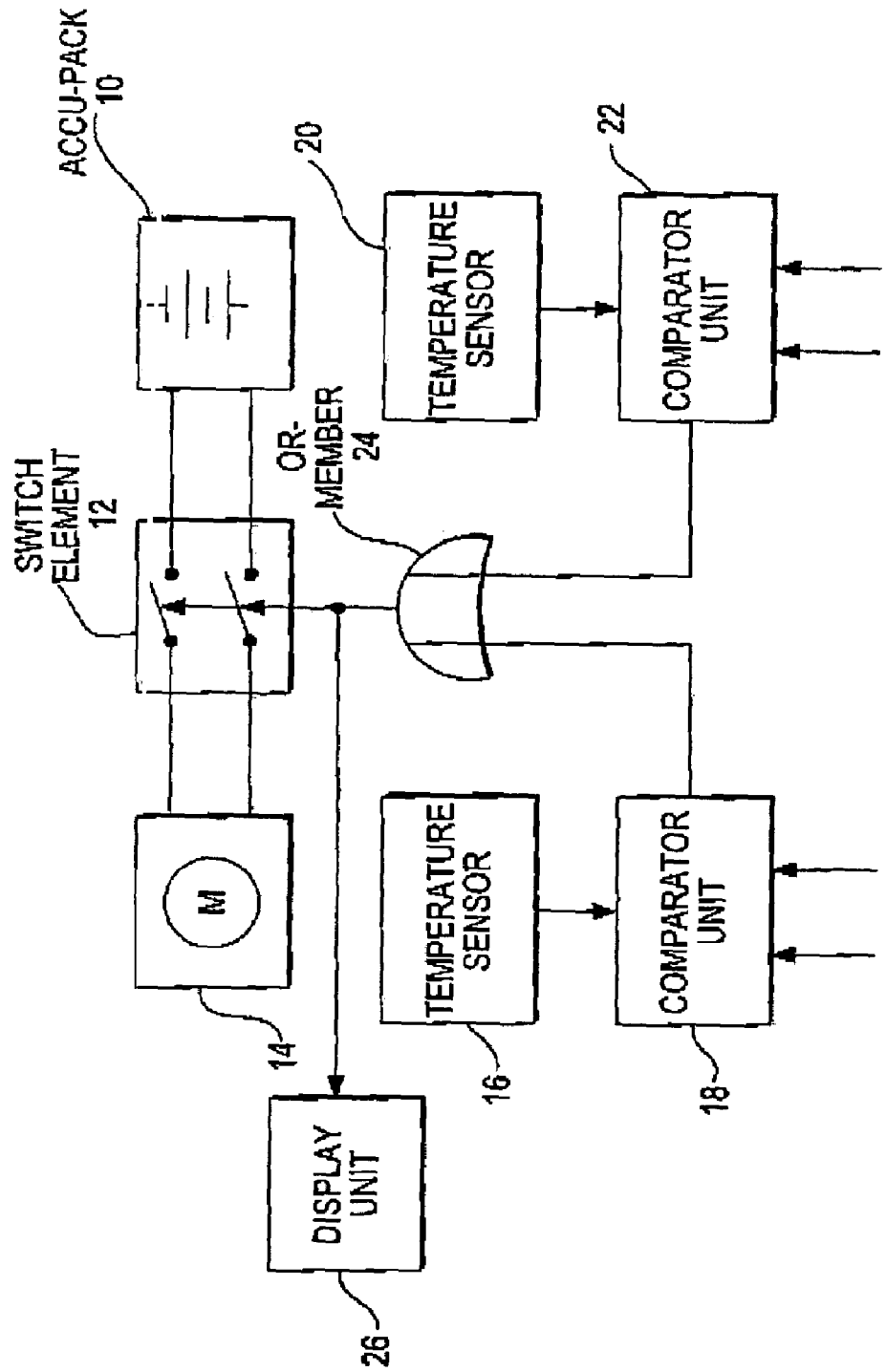
FIG. 1 shows a monitoring device of the present invention in a block diagram.

The embodiment represented in FIG. 1 serves for monitoring the temperature of a hand-held machining tool, whereby, for example, the machining tool can operate as accumulator-driven hand drill.

The current supply takes place by means of an accumulator pack ("accu-pack") 10, which is connected with an electric motor 14 that drives the hand-held machining tool via a controllable switch element 12. In addition, the hand-held machining tool has an electronic control and operating elements, which for the sake of simplicity, are not illustrated.

For measurement of the operating temperature of the electrical motor 14, the hand-held machining tool has a temperature sensor 16, which emits a corresponding temperature signal $T_{MOTOR}$ on the output side.

On the output side, the temperature sensor 16 is connected with a comparator unit 18, which compares the actual operating temperature $T_{MOTOR}$ of the electrical motor 14 with a predetermined minimal value $T_{MIN1}$ and a predetermined maximum value $T_{MAX1}$. Upon falling below the minimal value $T_{MIN1}$ and upon exceeding the maximum value $T_{MAX1}$, the comparator unit 18 emits a control signal with a logical high-level, whereas the comparator unit 18 at other times produces a logical low-level.

Furthermore, the monitoring device has a temperature sensor 20, which measures the operating temperature of the accu-pack 10 and produces a corresponding temperature signal $T_{ACCU}$ on the output side.

The temperature signal $T_{ACCU}$, likewise, is lead to a comparator unit 22, which compares the measured operating parameter with a predetermined minimal value $T_{MIN2}$ and a predetermined maximum value $T_{MAX2}$. Upon exceeding the maximum value $T_{MAX2}$ and upon falling below the minimal value $T_{MIN2}$, the comparator unit 22 produces then a control signal with a logical high-level, whereas the control signal at the output of the comparator unit 22 at other times has a logical low-level.

At the output side, the two comparator units 18, 22 are connected with an OR-member 24, which activates a control input of the switch element 12 and thereby switches the electric motor 14 on or off.

In addition, the Or-member 24 is also connected with a display unit 26, which comprises a signal lamp or warning light. Upon abandonment of the approved temperature range, then, the warning light of the display unit 26 is illuminated, whereby the user can recognize that the automatic switching on does not relate to an error function, rather is caused by an overheating or by too low of a temperature.

Figure 2:
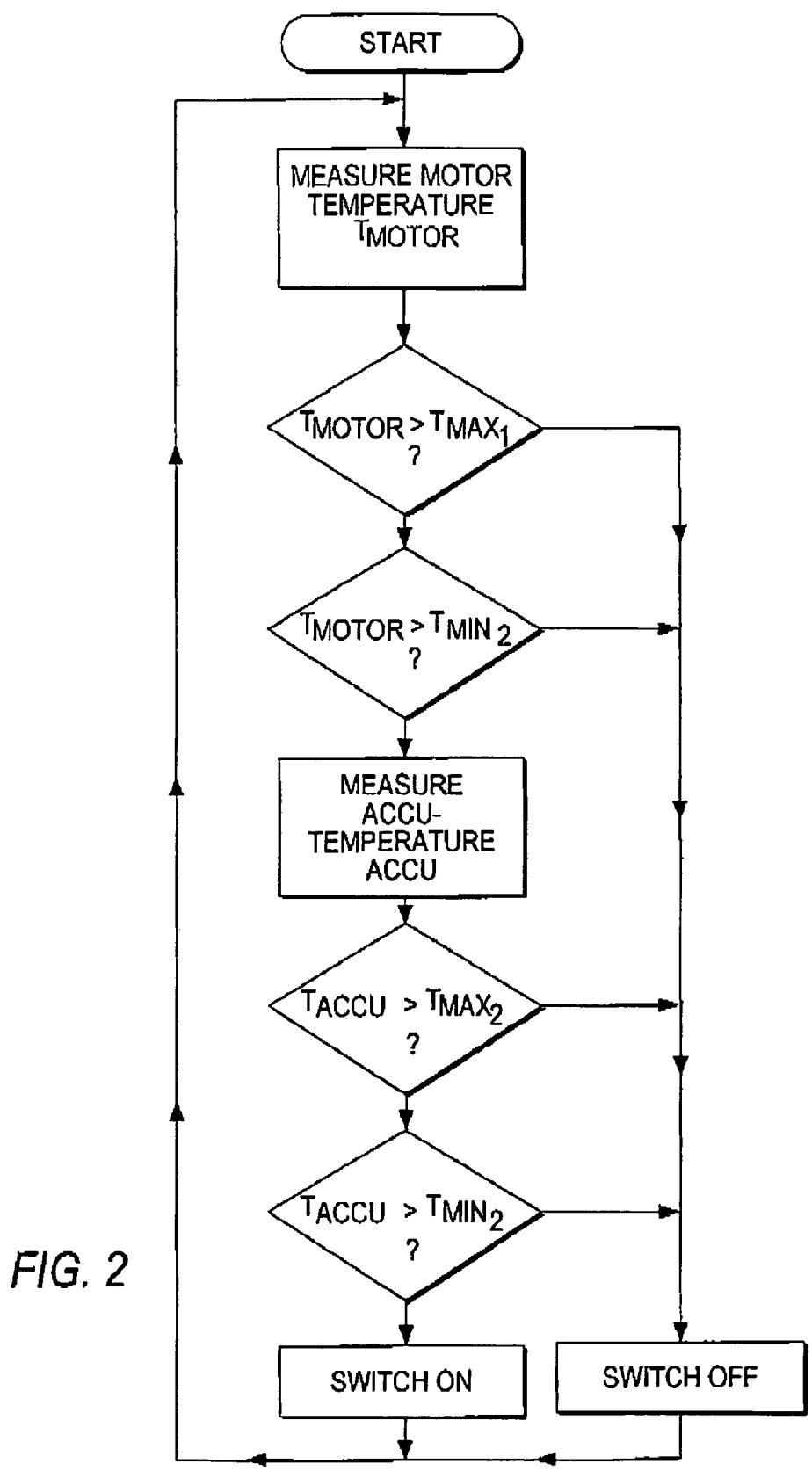
FIG. 2 shows the method of operating of the monitoring device of FIG. 1 as a flow diagram.

Next, the inventive method of operation will be described with reference to the flow diagram illustrated in FIG. 2.

In this connection, the operating temperature $T_{MOTOR}$ of the electric motor 14 first is measured in a continuous circuit and subsequently compared by the comparator unit 18 with the predetermined minimal value $T_{MIN1}$ and with the predetermined maximum value $T_{MAX2}$. Upon leaving the predetermined temperature region, the comparator unit 18 then activates the switch element 12 via the OR-member 24, such that the electric motor 14 is switched off.

In the event that the operating temperature of the electric motor 14 as well as the operating temperature of the accu-pack 10 is found within the prescribed temperature range, a low-level transmission contacts the input of the OR-member 24, so that the electric motor is switched on.

The predetermined temperature threshold values $T_{MIN1}$, $T_{MAX1}$, $T_{MIN2}$, and $T_{MAX2}$ for the electric motor 14 and the accu-pack are different and take into consideration the respective thermal capacitance.

It will be understood that each of the elements described above, or two or more together, may also find a useful application in other types of constructions differing from the types described above.

While the invention has been illustrated and described herein as a monitoring device, an electrical machining tool, a current supply device, and an associated method of operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. Monitoring device for temperature monrtoring with an accumulator-driven hand-held machining tool, with at least one switch element (12) for separating an electrical consumer (14) from a current supply device (10), wherein for determining a first temperature ($T_{MOTOR}$) of the consumer (14), a first sensor (16) is connected to the consumer (14), whereby the first sensor (16) is connected with a control input of the switch element (12) and/or with an optical and/or acoustical display unit (26) for controlling a switching process as a function of the first temperature ($T_{MOTOR}$), and wherein a second sensor (20) is provided in addition to the first sensor (16), wherein the second sensor determines a second temperature ($T_{ACCU}$), whereby both sensors (16, 20) are connected with a control input of the switch element (12), in order to control the switching process as a function of the first temperature ($T_{MOTOR}$) and the second temperature ($T_{ACCU}$).

2. Monitoring device according to claim 1, wherein at least one sensor (16, 20) is connected with a comparator unit (18, 22), wherein said comparator unit (18, 22) compares the first temperature ($T_{MOTOR}$) and the second temperature ($T_{ACCU}$) with a predetermined maximum value ($T_{MAX1}$, $T_{MAX2}$) and with a predetermined minimal value ($T_{MIN1}$, $T_{MIN2}$) and activates the switch element (12) as a function of the comparison.

3. Monitoring device according to claim 2, wherein the comparator unit (18, 22) is arranged in the electric consumer (14) or in the current supply device.

4. Monitoring device according to claim 1, wherein the switch element (12) is a relay, a power transistor, a triac, or a bi-metal switch.

5. Monitoring device according to claim 1, wherein the determined first temperature ($T_{MOTOR}$) is the temperature of the electrical consumer (14) and the second temperature ($T_{ACCU}$) is the temperature of the current supply device (10).

6. Monitoring device according to claim 1, wherein the electrical consumer (14) is an electric motor.

7. Monitoring device according to claim 1, wherein the current supply device (10) has an accumulator.

8. Monitoring device according to claim 1, wherein the first sensor (16) and/or a second sensor (20) are arranged in the electric consumer (14) or in the current supply device.

9. Monitoring device according to claim 1, wherein the switch element (12) is arranged in the electric consumer (14) or in the current supply device.

10. Electrical machining tool with a monitoring device according to claim 1.

11. Current supply device with a monitoring device according to claim 1.

12. Method of operation for a monitoring device for an electrical apparatus with the following steps:
   detecting a first temperature ($T_{MOTOR}$) of an electrical consumer (14) in an electrical apparatus;
   comparing the first temperature ($T_{MOTOR}$) with a predetermined maximum value ($T_{MAX1}$) and a predetermined minimal value ($T_{MIN1}$);
   optically and/or acoustically displaying a signal reproduced by the result of the comparison and separating the electrical consumer (14) from the current supply device (10) when the first temperature ($T_{MOTOR}$) exceeds the maximum value ($T_{MAX1}$) and separating the electrical consumer (14) from the current supply device (10) when the first temperature ($T_{MOTOR}$) falls below the minimal value ($T_{MIN1}$); determining a second temperature ($T_{ACCU}$) of the current supply device (10), whereby the electrical consumer (14) is separated from the current supply device (10) when the second temperature ($T_{ACCU}$) exceeds a second maximum value ($T_{MAX2}$), and whereby the electrical consumer (14) is separated from the current supply device (10) when the second temperature ($T_{ACCU}$) falls short of a second minimal value ($T_{MIN2}$).

13. Method of operation according to claim 12, wherein the electrical consumer (14) is again connected with the current supply device when the maximal value ($T_{MAX1}$) is again fallen short of or the minimal value ($T_{MIN1}$) is again exceeded.

14. Monitoring device for temperature monitoring with an accumulator-driven hand-held machining tool, with at least one switch element (12) for separating an electrical consumer (14) from a current supply device (10), wherein for determining a first temperature ($T_{MOTOR}$) of the consumer (14), a first sensor (16) is connected to the consumer (14) and whereby the first sensor (16) is connected with a control unit of the switch element (12) and/or with an optical and/or acoustical display unit (26) for controlling a switching process as a function of the first temperature ($T_{MOTOR}$), wherein said control unit separates said electrical consumer (14) from said current supply device (10) when said temperature falls short of a minimum value ($T_{MIN1}$), wherein a second sensor (20) is provided in addition to the first sensor (16), wherein the second sensor determines a second temperature ($T_{ACCU}$), whereby both sensors (16, 20) are connected with a control input of the switch element (12), in order to control the switching process as a function of the first temperature ($T_{MOTOR}$) and the second temperature ($T_{ACCU}$).

15. Monitoring device according to claim 14, wherein at least one sensor (16, 20) is connected with a comparator unit (18, 22), wherein said comparator unit (18, 22) compares the first temperature ($T_{MOTOR}$) and the second temperature ($T_{ACCU}$) with a predetermined maximum value ($T_{MAX1}$, $T_{MAX2}$) and with a predetermined minimal value ($T_{MIN1}$, $T_{MIN2}$) and activates the switch element (12) as a function of the comparison.

16. Monitoring device according to claim 15, wherein the comparator unit (18, 22) is arranged in the electric consumer (14) or in the current supply device.

17. Monitoring device according to claim 14, wherein the switch element (12) is a relay, a power transistor, a triac, or a bi-metal switch.

18. Monitoring device according to claim 14, wherein the determined first temperature ($T_{MOTOR}$) is the temperature of the electrical consumer (14) and the second temperature ($T_{ACCU}$) is the temperature of the current supply device (10).

19. Monitoring device according to claim 14, wherein the electrical consumer (14) is an electric motor.

20. Monitoring device according to claim 14, wherein the current supply device (10) has an accumulator.

21. Monitoring device according to claim 14, wherein the first sensor (16) and/or a second sensor (20) are arranged in the electric consumer (14) or in the current supply device.

22. Monitoring device according to claim 14, wherein the switch element (12) is arranged in the electric consumer (14) or in the current supply device.

23. Electrical machining tool with a monitoring device according to claim 14.

24. Current supply device with a monitoring device according to claim 14.

* * * * *